United States Patent
Frenznick

(10) Patent No.: US 9,039,287 B2
(45) Date of Patent: May 26, 2015

(54) PERFORATED COLLAPSIBLE SPACER

(71) Applicant: Dana Automotive Systems Group, LLC, Maumee, OH (US)

(72) Inventor: Jeremy M. Frenznick, Brighton, MI (US)

(73) Assignee: Dana Automotive Systems Group, Inc., Maumee, OH (US)

( * ) Notice: Subject to any disclaimer, the term of this patent is extended or adjusted under 35 U.S.C. 154(b) by 105 days.

(21) Appl. No.: 14/030,135

(22) Filed: Sep. 18, 2013

(65) Prior Publication Data

US 2015/0078700 A1    Mar. 19, 2015

(51) Int. Cl.
   *F16C 35/06*    (2006.01)

(52) U.S. Cl.
   CPC ...................................... *F16C 35/06* (2013.01)

(58) Field of Classification Search
   CPC .... F16C 19/383; F16C 19/385; F16C 19/548; F16C 35/06; F16C 43/04; F16C 2229/00
   See application file for complete search history.

(56) References Cited

U.S. PATENT DOCUMENTS

| | | |
|---|---|---|
| 1,111,660 A | 9/1914 | Malaby |
| 2,262,512 A | 11/1941 | Musselman |
| 2,341,981 A | 2/1944 | Davids |
| 2,673,336 A | 3/1954 | Peters |
| 2,762,252 A | 9/1956 | Karitzky |
| 2,895,315 A | 7/1959 | Fishtahler |
| 3,628,290 A | 12/1971 | Wilson |
| 3,744,274 A | 7/1973 | Sekiya |
| 3,952,608 A | 4/1976 | Kanai |
| 4,289,060 A | 9/1981 | Emmett |
| 4,289,061 A | 9/1981 | Emmett |
| 4,657,456 A | 4/1987 | Anquetin |
| 6,719,509 B1 | 4/2004 | Huang |
| 7,699,571 B2 | 4/2010 | Booher |
| 7,901,171 B2 | 3/2011 | Schruff |
| 2002/0196990 A1 | 12/2002 | Stanczak |

FOREIGN PATENT DOCUMENTS

DE    202008010554 U1    10/2008

OTHER PUBLICATIONS

Extended European Search Report with Written Opinion dated Nov. 3, 2014.

*Primary Examiner* — Thomas R. Hannon
(74) *Attorney, Agent, or Firm* — Marshall & Melhorn, LLC

(57) ABSTRACT

A perforated collapsible spacer controllably takes up space between two bearings on an automotive pinion. The perforated collapsible spacer is formed from a steel sheet having longitudinal edges that are joined together in a form of a tube having longitudinal perforated sections formed in its central portion. As a pinion nut is tightened, an axial clamping force is applied to the collapsible spacer that is located between tail and head bearing cones, where the central portion of the collapsible spacer is caused to buckle, so as to adjust the final space between the bearing cones while a spring force is maintained on the bearings. Yield points of the central portion with the perforated sections that buckle, are controllable depending on the steel sheet material thickness, and the size, shape and quantity of perforations in the steel sheet.

14 Claims, 2 Drawing Sheets

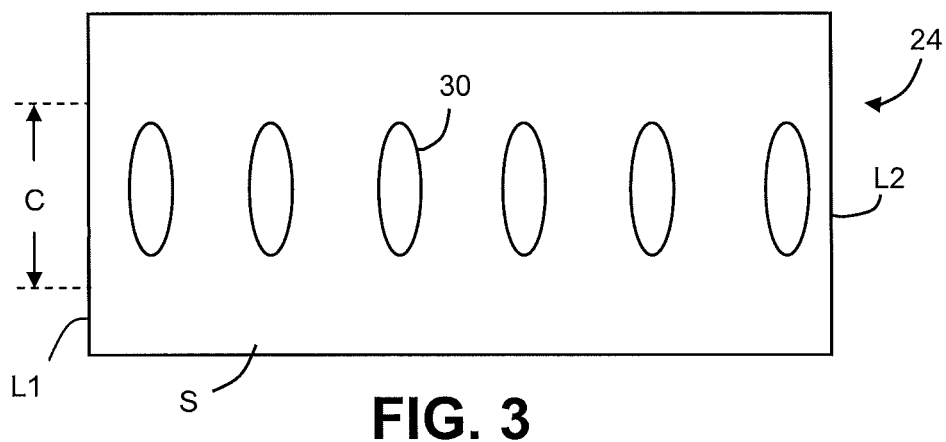
FIG. 3
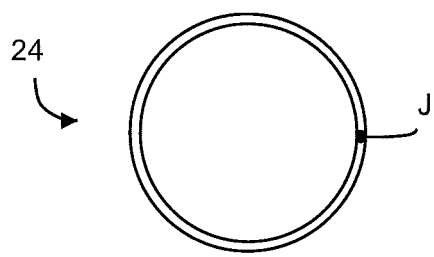
FIG. 4
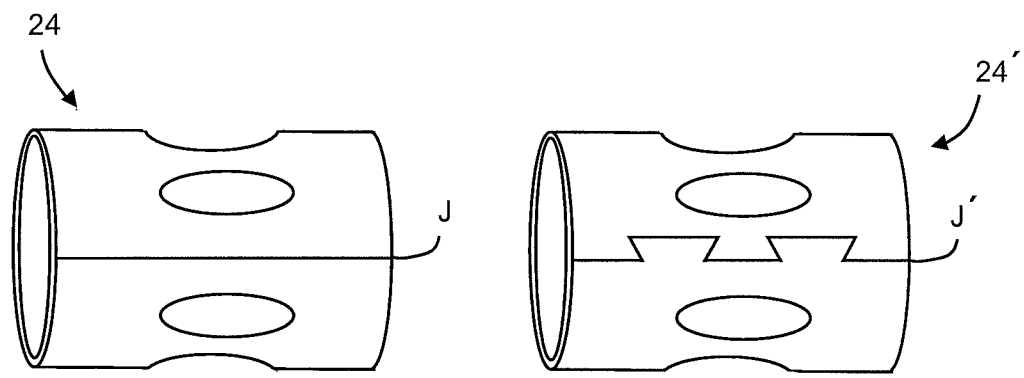
FIG. 5  FIG. 6

US 9,039,287 B2

PERFORATED COLLAPSIBLE SPACER

FIELD OF THE INVENTION

The present invention relates to a spacer that is utilized to take up space between two bearings on an automotive pinion. More particularly, the present invention relates to a perforated collapsible spacer that is utilized to controllably take up space between two bearings on an automotive pinion.

BACKGROUND OF THE INVENTION

It is common to utilize a spacer to take up space between two bearings on an automotive pinion, where the spacer is made from extruded tubular steel. It is not uncommon for such a tubular spacer to be collapsible (whereat a bulge is formed), so as to preload the bearings. However, conventional collapsible spacers are limited to a maximum stiffness load, at 0.75 mm deflection, of approximately 100 kilo-Newtons, which is due to the limitations of a bulge forming process that is utilized during installation of the collapsible tubular spacer.

In order to make a spacer bend more easily, some collapsible spacers have perforations placed through the tubular spacer wall. However, for these collapsible spacers, the perforations are placed away from a crush zone, which is typically at the center of the tubular spacer. Consequently, by placing the perforations away from the center of the conventional tubular spacer, the stiffness of these spacers are significantly decreased.

In addition, disposing perforations within tubular steel is expensive, which is due in part to the limited number of collapsible spacer manufacturers. Also, when the perforations are placed away from the center of the tubular spacer, it is required to re-engineer the crush zone at the center of the conventional tubular spacer in order to account for various parameters, like axial stiffness, bulge size control, and bulge location within the space between the two bearings on an automotive pinion shaft. Consequently, a steel tube that is perforated away from its center adds additional cost to the perforated tubular spacer. In addition to these negative cost effects that are associated with conventional perforated tubular spacers, it is difficult to adjust their spring rates.

As an example, U.S. Pat. No. 3,952,608 to Kanai discloses a collapsible spacer in a final drive unit of a motor vehicle having openings 20 as illustrated in FIGS. 1 and 2 of the Kanai patent. As shown, the openings 20 of the Kanai patent are in an area of the collapsible spacer that is away from the crush zone.

Since conventional collapsible spacers are made directly from extruded tubing the spring rate is not easily adjusted and therefore, the cost of the tubing further increases as its size increases. Also, it might be necessary for conventional spacers to have their material properties adjusted without perforating the wall of such a spacer so as to achieve deformation in a different manner. Unfortunately, recent design aspects in axles, such as plug-on propshafts, are requiring larger diameter pinion nuts that provide higher nut torque to resist loosening, so as to a achieve a much higher clamping force on more robust spacers. Consequently, there is a need for next generation collapsible spacers to resist these much higher clamp loads.

Therefore, what is sought is a collapsible spacer having perforations in a central portion thereof that is not constructed from extruded tubular steel. Such a perforated collapsible spacer must not lower axial stiffness at its center nor negatively affect the crush zone, bulge size, and bulge location. Such a perforated collapsible spacer must be able to cooperate with new axles that require higher nut torque to resist loosening, which in turn require higher clamp forces, so as to resist higher clamp loads. In addition, this perforated collapsible spacer needs to be less expensive to manufacture than a conventional tubular perforated collapsible spacer.

SUMMARY OF THE INVENTION

A perforated collapsible spacer is utilized to controllably take up space between two bearings on an automotive pinion. The perforated collapsible spacer is formed from a steel sheet having longitudinal edges that are joined together in a form of a tube having longitudinal perforated sections formed in a central portion thereof. As a pinion nut is tightened, an axial clamping force is applied to the collapsible spacer that is located between head and tail bearing cones, wherein the central portion of the collapsible spacer is caused to buckle, thereby adjusting the final space between the bearing cones while maintaining a spring force on the bearings. Yield points of the central portion with the perforated sections that buckle, are controllable depending on the steel sheet material thickness, and the size, shape, location and quantity of perforations in the steel sheet.

Further objects and advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

The above, as well as other advantages of the present invention will become readily apparent to those skilled in the art from the following detailed description when considered in the light of the accompanying drawings in which:

FIG. 3 is a plan view of a steel sheet with perforations, prior to being tubularly formed into the perforated collapsible spacer of FIG. 1;

FIG. 4 is an axial view of the perforated collapsible spacer of FIG. 1 after longitudinal ends of the steel sheet of FIG. 3 have been joined prior to installation within the pinion assembly of FIG. 1;

FIG. 5 is a three dimensional side view of the perforated collapsible spacer of FIG. 4 prior to installation within the pinion assembly of FIG. 1, where the longitudinally joined ends have a straight shape; and FIG. 6 is a three dimensional side view of the perforated collapsible spacer similar to that of FIG. 4 prior to installation within the pinion assembly of FIG. 1, where the longitudinally joined ends have a dove tailed shape.

DETAILED DESCRIPTION OF THE INVENTION

Figure 1:
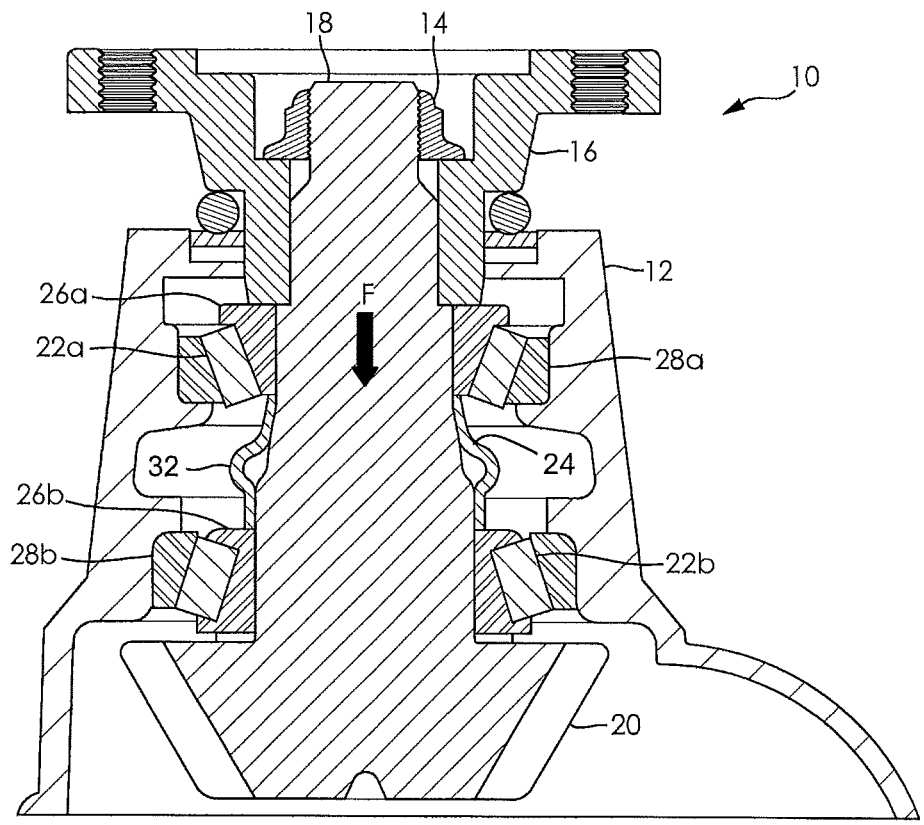
FIG. 1 is a cross-sectional view of a pinion assembly having a perforated collapsible spacer, in accordance with the invention.
Figure 2:
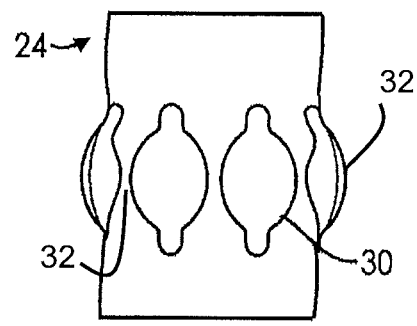
FIG. 2 is a side plan view of the perforated collapsible spacer of FIG. 1, where the perforated collapsible spacer has been partially collapsed.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

FIG. 1 illustrates an automotive pinion assembly 10 comprising an axle housing 12, pinion nut 14, end yoke 16, pinion shaft 18 with a pinion gear 20 attached thereto, tail and head bearings 22a, 22b, a perforated collapsible spacer 24 with at least two perforations 30 disposed through a central portion C thereof (see FIG. 3). In FIG. 1, the perforated collapsible spacer 24 is shown disposed between and in physical contact with tail and head bearing cones 26a, 26b, and tail and head bearing cups 28a, 28b.

Following installation of the pinion shaft 18, pinion gear 20, and end yoke 16 into the axle housing 12, the pinion nut 14 is secured onto the pinion shaft 18 by tightening the pinion nut 14 thereto, thereby applying a compressive clamping force F down the pinion shaft 18. Consequently, the force F causes the perforated collapsible spacer 24 to form a buckle 32 between the tail and head pinion cones 26a, 26b, thereby applying a preload on the bearings 22a, 22b.

FIGS. 2-6 illustrate the perforated collapsible spacer 24, which is constructed of a flat stamping of a steel sheet S with the longitudinal perforations 30 completely stamped initially within the central portion C and having longitudinal edges L1, L2 (see FIG. 3). The central portion C, which is in the axial middle 50% portion of the steel sheet S, corresponds to a crush zone where the buckle 32 is likely to form as a result of the compressive force F being applied to the pinion shaft 18 by the tightening of the pinion nut 14. The stamping of the perforations 30 is followed by rolling and mechanical joining operations that result in a form of a tube (see FIGS. 2 and 4-6).

The mechanical joining operation may involve utilizing multiple spot welds at joint J (see FIG. 5), thereby forming a strong axial bond along the straight longitudinal edges L1, L2. Even further, the mechanical joining operation may involve interlocking multiple dovetail features along with spot welds at joint J' (see FIG. 6), which present more welding length at differing angles so as to form an even stronger axial bond, when the perforated collapsible spacer 24 becomes buckled.

By way of the above-described rolled steel sheet constructions, a thicker steel sheet can be utilized to increase a spring rate of the centrally located perforated collapsible spacer 24. In addition, it has been found that various shapes of the centrally located perforations 30 can also be used to tailor the spring rate of the perforated collapsible spacer 24.

Examples of the shapes of the perforations 30 are oval, square, rectangular, diamond, and circular, or a mixture thereof. Although the perforations 30 are shown radially in-line, they may be radially staggered from one another, within the central portion C. Hence, the perforated collapsible spacer 24 is not formed from an extruded steel tube as conventional spacers are constructed.

When the pinion nut 14 is tightened, the remaining material between the perforations 30 in the central portion C form the buckle 32, due in part to the fact that there is less material in the central portion C. This is shown by a partially buckled perforated collapsible spacer 24 in FIG. 2. Contributing to the buckling is the yield point of the material, in the central portion C, which is knowingly controlled by way of the steel sheet material thickness, and the location, size, shape and quantity of perforations in the steel sheet.

It has also been found that the collapsible non-extruded tubular spacer 24, with the perforations in the central portion C thereof, retains its axial stiffness at its center C, wherein the crush zone, bulge size, and bulge location are not negatively affected. Further, the perforated collapsible spacer 24 cooperates with new axles (not shown) that require higher nut torque to resist loosening, which in turn results in higher clamp forces. Consequently, the automotive pinion assembly 10 is capable of being used with a plug-on propshaft, thereby satisfying the need for a next generation collapsible spacer that resists a higher clamp load. In addition, the perforated collapsible spacer 24 is less expensive to manufacture than a conventional extruded tubular perforated collapsible spacer.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An automotive pinion assembly comprising:
   a perforated collapsible spacer comprising a steel sheet having two longitudinal edges joined in a form of a tube, with a central portion formed in a buckle, and located between preloaded tail and head bearings, wherein the central portion of the perforated collapsible spacer is initially located within the axial middle 50% portion of the steel sheet with longitudinal perforations formed therein.

2. The automotive pinion assembly of claim 1, further comprising an axle housing, pinion nut, end yoke, pinion shaft with a pinion gear attached thereto, wherein the perforated collapsible spacer is in physical contact with and located between tail and head bearing cones and tail and head bearing cups.

3. The automotive pinion assembly of claim 2, wherein the shape of the longitudinal perforations is selected from the group consisting of an oval, square, rectangular, diamond, and circular, wherein further a spring rate of the perforated collapsible spacer is adjustable.

4. The automotive pinion assembly of claim 3, wherein the location of the longitudinal perforations of the steel sheet are selected from the group consisting of radially aligned within the central portion of the steel sheet and non-radially aligned within the central portion of the steel sheet.

5. The automotive pinion assembly of claim 1, wherein the shape of the steel sheet longitudinal edges are selected from the group consisting of straight edges with multiple spot welds at a first joint and interlocking multiple dovetail features with multiple spot welds at a second joint.

6. An automotive pinion assembly comprising:
   an axle housing;
   pinion nut;
   end yoke;
   pinion shaft with a pinion gear attached thereto;
   preloaded tail and head bearings;
   a perforated collapsible spacer comprising a steel sheet having two longitudinal edges joined in a form of a tube with at least two perforations formed in a buckle in a central portion thereof, the perforated collapsible spacer being disposed between and in physical contact with tail and head bearing cones;
   wherein the central portion is located within the axial middle 50% portion of the steel sheet and with maximum stiffness load, at 0.75 mm deflection, greater than 150 kilo-Newtons.

7. The automotive pinion assembly of claim 6, further comprising tail and head bearing cups respectively in physical contact with the tail and head bearings and further in physical contact with the perforated collapsible spacer.

8. The automotive pinion assembly of claim 7, wherein the shape of the longitudinal perforations is selected from the group consisting of an oval, square, rectangular, diamond, and circular, wherein further a spring rate of the perforated collapsible spacer is adjustable.

9. The automotive pinion assembly of claim 6, wherein the location of the longitudinal perforations of the steel sheet are selected from the group consisting of radially aligned within the central portion of the steel sheet and non-radially aligned within the central portion of the steel sheet.

10. The automotive pinion assembly of claim 6, wherein the shape of the steel sheet longitudinal edges are selected from the group consisting of straight edges with multiple spot welds at a first joint and interlocking multiple dovetail features with multiple spot welds at a second joint.

11. A method of assembling a perforated collapsible spacer in an automotive pinion assembly comprising:
providing a steel sheet having two longitudinal edges;
forming longitudinal perforations in a central portion of the steel sheet;
joining together the longitudinal edges, thereby forming a perforated collapsible spacer that is tubular;
providing an automotive pinion assembly comprising an axle housing, pinion nut, end yoke, pinion shaft with a pinion gear attached thereto, tail and head bearings, tail and head pinion cones, and tail and head bearing cups, wherein the perforated collapsible spacer is disposed about the pinion shaft and in physical contact with the tail and head pinion cones;
wherein, when a pinion nut is tightened onto the pinion shaft, a buckle is formed in a central portion of the perforated collapsible spacer, thereby preloading the tail and head bearings.

12. The method of assembling a perforated collapsible spacer in an automotive pinion assembly of claim 11, wherein the central portion of the perforated collapsible spacer is located within the axial middle 50% portion of the steel sheet.

13. The method of assembling a perforated collapsible spacer in an automotive pinion assembly of claim 11, wherein the shape of the longitudinal perforations is selected from the group consisting of an oval, square, rectangular, diamond, and circular, thereby allowing for an adjusting of a spring rate of the perforated collapsible spacer.

14. The perforated collapsible spacer within an automotive pinion assembly of claim 11, wherein the shape of the steel sheet longitudinal edges are selected from the group consisting of straight edges with multiple spot welds at a first joint and interlocking multiple dovetail features with multiple spot welds at a second joint.

* * * * *